(12) United States Patent
Wilkinson et al.

(10) Patent No.: US 7,387,770 B2
(45) Date of Patent: Jun. 17, 2008

(54) METHOD FOR FERRIC SULFATE MANUFACTURING

(75) Inventors: Mark Alan Wilkinson, Lincoln, MA (US); Joseph Hurd, Sandy Creek, NY (US); David Stone, Bridgewater, NJ (US)

(73) Assignee: General Chemical Performance Products Inc., Parsippany, NJ (US)

( * ) Notice: Subject to any disclaimer, the term of this patent is extended or adjusted under 35 U.S.C. 154(b) by 254 days.

(21) Appl. No.: 11/162,055

(22) Filed: Aug. 26, 2005

(65) Prior Publication Data

US 2007/0048213 A1 Mar. 1, 2007

(51) Int. Cl.
*C01G 49/00* (2006.01)

(52) U.S. Cl. .................. 423/558; 423/146; 423/DIG. 2

(58) Field of Classification Search ................ 423/146, 423/558, DIG. 2
See application file for complete search history.

(56) References Cited

U.S. PATENT DOCUMENTS

| | | | |
|---|---|---|---|
| 2,252,332 A | 8/1941 | Plummer | |
| 2,306,425 A * | 12/1942 | Bevan | ........................ 423/558 |
| 3,954,953 A | 5/1976 | Satterwhite | |
| 4,036,941 A | 7/1977 | Boyles | |
| 4,507,273 A * | 3/1985 | Hudson | ...................... 423/558 |
| 4,707,349 A | 11/1987 | Hjersted | |
| 4,814,158 A | 3/1989 | Everill | |
| 5,332,565 A * | 7/1994 | Derka | ........................ 423/558 |
| 5,766,566 A | 6/1998 | Mattila | |
| 6,375,919 B1 | 4/2002 | Kakio | |
| 7,067,100 B2 * | 6/2006 | Faigen et al. | ................ 423/558 |

* cited by examiner

*Primary Examiner*—Timothy C. Vanoy
(74) *Attorney, Agent, or Firm*—Arthur J. Plantamura

(57) ABSTRACT

A process is provided for the production of liquid ferric sulfate from finely-divided ferric oxide, sulfuric acid and water in a reaction system comprising at least one closed reaction vessel at temperatures ranging from about 120° C. to about 150° C. and pressures from about 25 psi to about 70 psi. Iron oxide streams are fed countercurrent to the ferric sulfate reaction product stream and to the sulfuric acid and water feeds. The continuity of the reaction is effected by re-circulating fractions while withdrawing a fraction of the liquid ferric sulfate having a trivalent iron concentration of at least 10% from the reaction vessel. Yield and efficiency are provided by controlling the rate of iron ore, sulfuric acid and specific gravity and by counter current cycling the waste stream from the reaction through the dilution water and use of a polymeric settling agent to remove unreacted iron content from the digester output.

18 Claims, 2 Drawing Sheets

METHOD FOR FERRIC SULFATE MANUFACTURING

BACKGROUND OF THE INVENTION

This invention relates to the manufacture of liquid ferric sulfate by an improved continuous or semi-continuous process. More particularly, the invention relates to a system that affords better control and efficiency in producing liquid ferric sulfate from finely-divided iron ore, sulfuric acid, and water.

DESCRIPTION OF PRIOR ART

Ferric sulfate is a known product. It is commonly used, for example, in potable water purification and sewage treatment processes. These purification processes involve using ferric sulfate as a flocculent to remove suspended particles in the water.

Ferric sulfate has been produced from a variety of materials under different conditions. In the past, it has been commercially produced by reacting flue dust with sulfuric acid in a batch process, as in the Plummer U.S. Pat. No. 2,252,332 which, describes a process for making dry ferric sulfate, wherein the flue dust comprises a waste product of a smelter and has less than 60% total iron content. The reaction between the flue dust and ferric sulfate is exothermic driving off the water from the reaction. The resultant product is a solid mass, which usually takes the form of fines, granules and large clumps. This solid mass is inconvenient for use by customers because of the difficulty encountered in transporting and feeding of the solid mass to wastewater treatment systems.

U.S. Pat. No. 4,814,158 ("158") to Everill discloses the manufacture of ferric sulfate solution wherein liquid ferric sulfate is produced from finely-divided ferric oxide, sulfuric acid and water in a closed reaction vessel at temperatures ranging from about 130° C. to about 150° C. and pressures from about 30 psi to about 40 psi. The reaction time ranges from four to eight hours and produces liquid ferric sulfate having at least 10% trivalent iron.

In this method, however, in order to drive down free acid concentrations in the resulting ferric sulfate solutions, super-stoichiometric quantities of iron ore must be fed to the batch reactor, resulting in residual iron ore that must be discarded or reprocessed.

U.S. Pat. No. 6,375,919 to Rakio discloses the manufacture of ferric sulfate solution wherein iron ore containing 30% by weight or more FeOOH as a trivalent iron ($Fe^{3+}$) is calcined at 200-600° C., and then dissolved in sulfuric acid.

A disadvantage of this method is the high energy consumption and operating cost of calcining FeOOH at these high temperatures and the high capital cost of calcining equipment.

From the foregoing reference and known prior art it is apparent that a need exists for an improved economically efficient method for the manufacture of liquid ferric sulfate.

SUMMARY OF THE INVENTION

The present invention provides a continuous or semi-continuous process for the manufacture of liquid ferric sulfate from finely divided iron ore, sulfuric acid, and water. In the preferred embodiment of the invention, the iron ore contains at least about 93% and preferably about 95% to about 98% total iron by weight, and utilizes streams of water and of sulfuric acid of a concentration of at least about 90% and preferably a concentration of about 93% to about 98%. The reactants are fed to and re-circulated through a system comprised of a series of reaction vessels maintained at temperatures ranging from about 100° C. to 150° C. and at pressures from about 10 psig to about 50 psig for suitable periods of time to effect a conversion of the iron ore to ferric sulfate. In the course of the reaction, a stream of the reaction product and a stream of solids for disposal are withdrawn at predetermined rates while continuous streams of iron ore, sulfuric acid, recycled process filtrate, recycled process solids, and water are fed to the system at rates to maintain steady-state operation.

In an alternative embodiment of the present invention, the iron ore contains at least about 93% and preferably about 95% to about 98% total iron by weight, and utilizes streams of water and of sulfuric acid of a concentration of at least about 90% and preferably a concentration of about 93% to about 98%. The reactants are fed to a fixed-bed reactor in which the iron ore comprises the fixed bed is maintained at temperatures ranging from about 100° C. to 150° C. and at pressures from about 10 psig to about 50 psig with suitable residence time of the liquid stream to effect a conversion of the sulfuric acid to ferric sulfate. In the course of the reaction, a stream of the reaction product is withdrawn at predetermined rates while continuous streams of sulfuric acid, recycled process filtrate, recycled process solids, and water are fed to the system at rates to maintain steady-state operation.

The product throughput of the process and the quality of the final product may be enhanced by the addition to the reaction product of a small but effective amount of a polymeric settling aid. Any of a variety of suitable known polymeric materials may be used for this function. Cationic polymers as a class are desirable as settling agents with cationic polyacrylamide being a preferred example.

In accordance with the invention, we have discovered that re-circulating one or more portions of the reaction products to the system provides an improved overall yield from the iron ore, permits better control of the continuous operation, and reduces the environmental impact of the process by minimizing the discharge of unreacted material. Another beneficial aspect of the invention resides in the fact that substantially reproducible consistent results are obtainable, even with variations in ore quality and scrubber recovery by appropriate monitoring and adjusting the specific gravity of the reacting mixture.

The process of the invention, by a monitoring of the analysis of the quality of the reaction product stream being continuously withdrawn from one or more of the reaction vessels, facilitates the feeding of a predetermined proper quantity of water, of finely-divided iron ore, and of concentrated sulfuric acid. The continuity aspect of the operation allows for a better control of the heating and cooling functions of the reacting mixture such that runaway reactions are relatively unlikely from temperature increases. From an efficiency standpoint, this obviates the need for heating/cooling cycles on the reactor, conserving energy and reducing thermal strain on the reactor. Control of the suitable reaction temperature and pressure is facilitated by appropriate (known) reactor instrumentation and reaction product stream withdrawal. The temperature of the reaction in the system of the invention is preferably maintained in the range of from about 100° C. to about 150° C. during the process. The resulting liquid ferric sulfate produced in accordance with the process of the invention generally comprises about 12% trivalent iron.

DETAILED DESCRIPTION OF THE INVENTION

Figure 1:
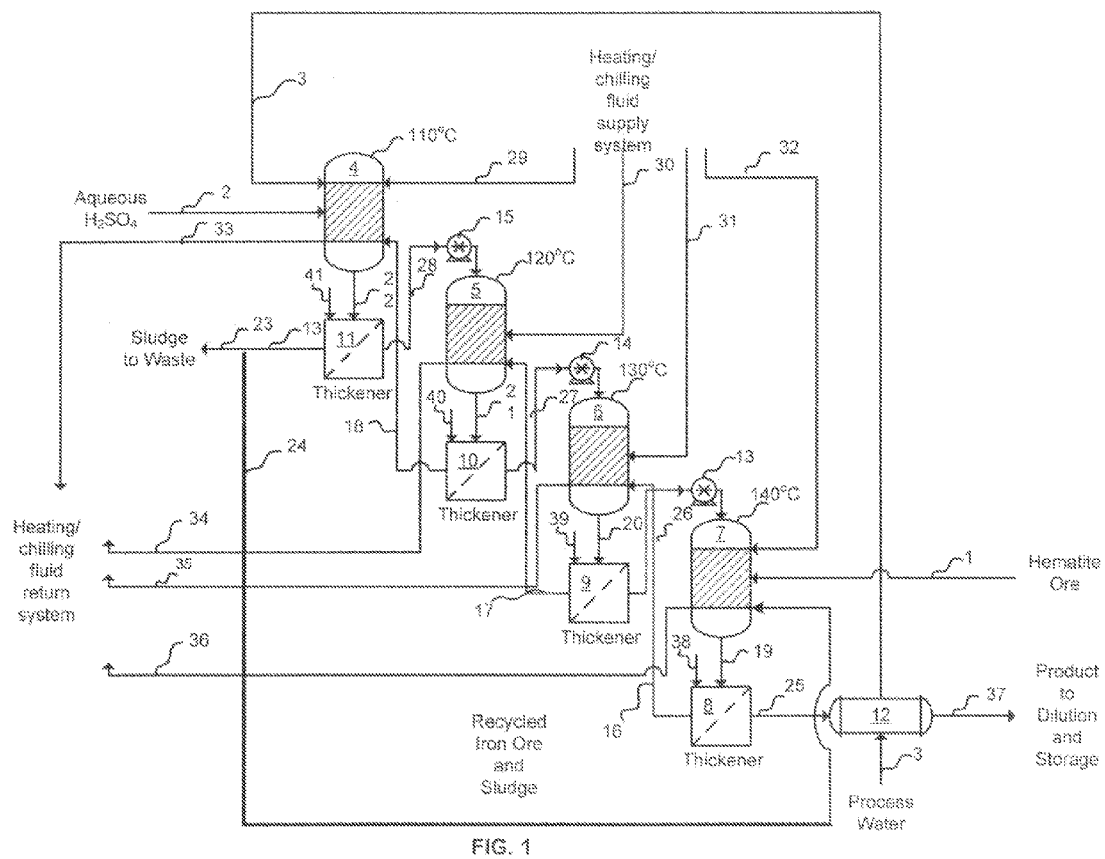
FIG. 1 illustrates a flow diagram of a liquid ferric sulfate manufacturing system according to the invention using a series of four reaction vessels.

In the improved process for the production of liquid ferric sulfate using finely-divided iron ore, sulfuric acid and water, in accordance with the invention, the ferric sulfate produced contains minimal, if any, insoluble material and the product is advantageous for the consumer market because the product contains few inerts that may reduce cost effectiveness and add to product handling and housekeeping difficulties. In the invention, purification of the product may be and preferably is enhanced by the introduction of a suitable settling agent, preferably polymeric settling agent which aids in the removal of undissolved iron fines, if any, from the reactor output. Several techniques may be used to purify the product stream. These include, for example, conventional settling, filtration with or without an aid such as diatomaceous earth, and use of centrifugal force (e.g., a cyclone cleaner or a rotating screen). Additionally, in accordance with the invention, the yield is enhanced by recycling the solid rich waste streams from the reactor or reactors in a direction countercurrent to the product stream. The reaction is preferably maintained at a temperature which can range from about 100° C. to about 150° C. As the conversion of the sulfuric acid nears completion, it is desirable that the reaction temperature remains within a range from about 135° C. to about 145° C. and more preferably by maintaining it at or near 140° C. In contrast, at low sulfuric acid conversion levels it is desirable to maintain the reaction temperatures between about 100° C. to 120° C. and more preferably by maintaining at or near 110° C. It is desireable, also, as the conversion of the sulfuric acid nears completion, that the reactor pressure remains within a range from about 24 psig to about 32 psig and more preferably by maintaining it at or near 28 psig. In contrast, at low sulfuric acid conversion levels it is desirable to maintain the reaction pressures between about 3 psig to 7 psig and more preferably by maintaining it at or near 5 psig. It is anticipated that higher pressures would result in faster reaction and therefore would be more desirable, although reactor vessel and ancillary equipment costs would be higher. Agitation of the mixture during the reaction process is preferable in expediting and ensuring complete reaction.

In the preferred embodiment of this invention, finely-divided iron ore having a ferric oxide content of preferably about 98% is combined with water and a sulfuric acid of about 93% concentration in at least one, preferably closed reaction vessel. The system of the invention is devised to utilize a plurality of reaction vessels arranged in series. The re-circulating nature of the reaction permits the use of iron ore containing as little as 50% total iron oxide. The total acid fed to the reaction vessels must be a sufficient quantity to react essentially completely with the iron ore. It is apparent that the use of lower concentrations of iron oxide and sulfuric acid may result in additional external energy requirement to get the mixture to reaction temperature and pressure. By use of suitably designed reactors and controls, the raw material mix may be used to affect the reactor conditions and minimize the need for external heating and cooling.

The invention contemplates the use of one or a plurality of reactors in series, such as two to four reactors in series.

The raw materials used in deriving optimum results in accordance with the invention are commercially available. Finely divided iron ore containing about 98% ferric oxide is commercially available and may be obtained, for example, from Densitech under the tradename Densimix. This particular material contains about 67% ferric iron in the form of ferric oxide, and the particle size is less than about 20 microns, a size which facilitates rapid reaction with the sulfuric acid. The concentrated (92%-95%) sulfuric acid employed in the process of the invention is available from a variety of suppliers, for example, Phelps Dodge, which sells $H_2SO_4$ having a concentration of approximately 93%.

While the particle size of the iron ore is not critical, smaller particle size is preferable as such accelerates the reaction. In general, a particle size below about 200 microns should be utilized. Preferably, the iron ore employed should have a particle size below about 100 microns.

The weight ratio of the ingredients will range from about 17 wt % to about 35 wt % ferric oxide, 20 wt % to 40 wt % $H_2SO_4$, and 35 wt % to 47 wt % $H_2O$. A preferred range of weight ratios is from about 25 wt % to 30 wt % ferric oxide, 22 wt % to 32 wt % $H_2SO_4$ and 38 wt % to 44 wt % $H_2O$. An especially preferred weight ratio is about 28% ferric oxide, 30% sulfuric acid and 42% water. The temperature in the final reaction vessel is preferably maintained at about 140° C. and the pressure in the final reaction vessel is held at about 28 psi while the mixture is being reacted. After each reaction vessel, the liquid ferric sulfate stream containing suspended, unreacted ferric oxide is withdrawn and fed to a solid-liquid separation device, for example, a settling tank, a thickener, a filter, or a hydroclone, in order to produce two streams. One stream is rich in a ferric sulfate and the other stream is rich in unreacted solids. For all reactors except the first in the series, containing the highest concentration of acid and the lowest concentration of ferric sulfate, the solids-rich stream is fed countercurrently to a reaction vessel containing a higher concentration of acid and a lower concentration of ferric sulfate. A portion of the solids-rich stream produced in the first reactor in the series is discarded as sludge and sent to waste disposal. The remaining portion of the solids-rich stream produced in the first reactor in the series is sent to the last reactor in the series for additional reaction. The ferric sulfate solution from each reactor is fed to the next reactor in series, which reactor contains a higher concentration of ferric oxide or, if the solution is discharged from the last reactor in the series, it is fed to the product handling system wherein the liquid ferric sulfate stream is cooled to prevent undesired hydration, filtered, and diluted, if necessary, to yield a solution having about 10% trivalent iron.

In another embodiment of the invention, the reactant feeds may be introduced to one or more fixed or fluidized bed reactors in which the ferric oxide solids are retained in the reactor and the liquids are passed through the solids in a relatively plug flow so that product may be continuously removed from each reactor. Iron may be fed to each reactor continuously or intermittently in such a manner as to optimize the contacting of the sulfuric acid with the iron oxide particles. The temperature of each reactor can be controlled by a combination of the feed rates, external heating, external cooling, or feed preheating. In a preferred embodiment, the temperature of each reactor is increased from the inlet region to the outlet region in order to prevent excessive pressure drops by reducing the viscosity of the ferric sulfate rich solution, to compensate for reduced reaction rates as a result of a falling acid concentration, and to reduce sulfuric acid corrosive attack on the reactor vessel components from the sulfuric acid in the entry region, where sulfuric acid concentrations are highest. The solids in such a reactor can be retained or partially retained until reaching a small particle size by placing a filter medium or screen near the exit of the reactor. Suitable filter media would include cloth fabric, diatomaceous earth, porous ceramic, or other materials capable of operating under the chosen operating conditions. One or more baffles in each reactor may be used as a means of preventing channeling or otherwise short-circuiting the solid bed. The reactors can be operated in a manner to continuously purge unreactive solids, or arranged to be periodically emptied of accumulated solids. Emptying of the reactor may be suitably performed, for example, when the pressure drop across the reactor rises to a threshold value at a constant feed rate, or alternatively, when the flow rate drops to a threshold rate at constant pressure drop across the reactor.

In the process of the invention, a regular removal of both "final product" and "reactor purge" occurs. This may be effected by either continuous or intermittent withdrawal from the reactor as may be advantageous for the overall system. The purge stream may be discharged as waste or preferably sold as a by-product.

It is preferable to provide a cooling mechanism for the hot liquid ferric sulfate product to facilitate further handling and storage in fiber reinforced plastic or other containers that require operating temperatures lower than those used during reaction. The invention also contemplates use of evolved "waste" heat to preheat the incoming raw materials. This waste heat may be extracted as the final product is cooled or from cooling of the reactors to compensate for the heat of reaction. For example, the process water could be preheated by indirect heat exchange with the final product stream prior to being fed into the first reactor. Alternatively, the process water could be preheated by indirect heat exchange with one or more of the reactors prior to being fed into the first reactor. Optionally, for waste heat recovery, the cooling fluid from one reactor could be fed back to the first reactor in order to supply heat when needed.

The liquid ferric sulfate produced by this invention contains up to about 14% trivalent iron. Since most commercial operations use solutions of about 10% trivalent iron, the liquid ferric sulfate is readily diluted with a predetermined amount of water which can be easily calculated by a person of ordinary skill in the art based on the specific gravity of the ferric sulfate solution.

Figure 2:
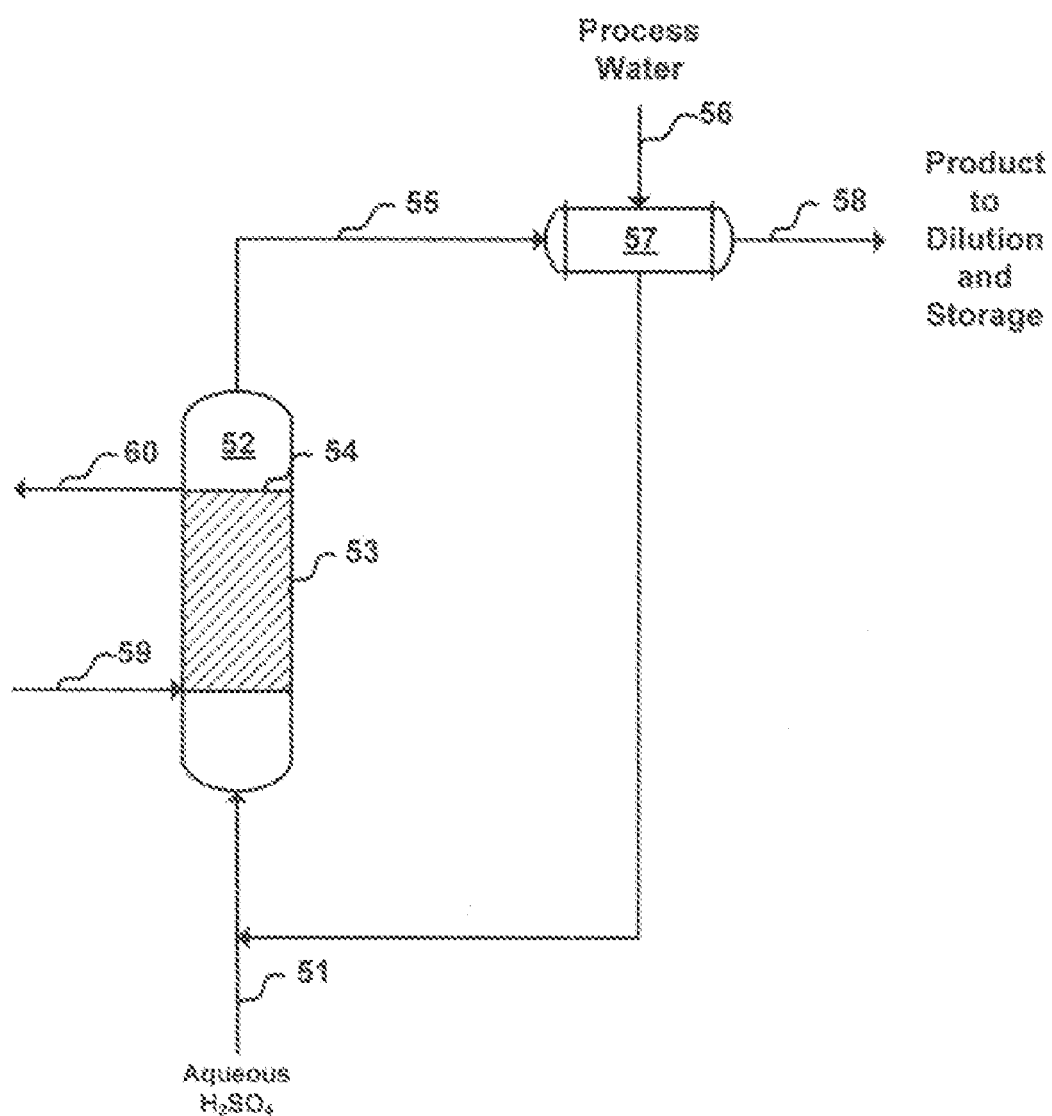
FIG. 2 illustrates a flow diagram of an alternative liquid ferric sulfate manufacturing system according to the invention using a single fixed-bed reactor.

The process flow for the improved liquid ferric sulfate manufacture will be apparent from the foregoing and the details thereof more fully clarified by a reference to FIGS. 1 and 2 and the descriptions provided hereunder.

As shown in FIG. 1, finely divided hematite ore (ferric oxide) 1, crude liquid product 26, and recycled iron ore and sludge 24 are fed to the last reactor 7 of a series of four reactors 4-7. Concentrated (93 wt %) sulfuric acid 2, process water 3, and iron oxide 18 from thickener 10 are fed to the first reactor 4. The reactor 4 is stirred and temperature is controlled by indirect heat exchange by pumping a heating or chilling fluid, typically steam or water, respectively, through external coils (not shown) on the reactors. The temperature in the first reactor 4 is controlled by feeding heating or chilling fluid through line 29 to the external cooling coils and then back to the heating or chilling system through return line 33. The crude product from the first reactor 4 is fed to a thickener 11 where a solids rich sludge stream 13 is separated from a liquid-rich crude product stream 28. A stream 41 containing settling agent may be fed to the thickener to expedite the separation of solids from the liquid. The solids rich sludge stream 13 suitably is split into a purge stream 23 that is sent for disposal and a recycle sludge stream 24 that is fed to the last reactor 7. The purge rate of the sludge stream 23 is controlled so that the rate of solids purging is preferably about 2-4 times the rate of solids fed to the system in stream 1 minus feed rate of ferric oxide in stream 1. The first reactor 4 is operated preferably at about 110° C. and approximately 10 psig. The crude liquid product in stream 28 is acid-rich and low in ferric sulfate concentration compared to the desired final product. Stream 28 is fed to pump 15 and then fed to the second reactor 5 where further reaction occurs with iron oxide fed to reactor 5 from thickener 9 in stream 17.

The reactor 5 is stirred and temperature is controlled by indirect heat exchange by pumping a heating or chilling fluid, typically steam or water, respectively, through external coils on the reactors. The temperature in the reactor 5 is controlled by feeding heating or chilling fluid through line 30 to the external cooling coils and then back to the heating or chilling system through return line 34. The crude product 21 from reactor 5 is fed to a thickener 10 where a solids rich sludge stream 18 is separated from a liquid-rich crude product stream 27. A stream 40 containing settling agent may be fed to the thickener 10 to expedite the separation of solids from the liquid. The solids rich sludge stream 18 is fed to reactor 4 and the liquid-rich crude product stream 27 is fed through pump 14 to the next reactor 6. The second reactor 5 is operated preferably at about 120° C. and approximately 16 psig.

The reactor 6 is stirred and temperature is controlled by indirect heat exchange by pumping a heating or chilling fluid, typically steam or water, respectively, through external coils on the reactors. The temperature in the reactor 6 is controlled by feeding heating or chilling fluid through line 31 to the external cooling coils and then back to the heating or chilling system through return line 35. The crude product 20 from reactor 6 is fed to a thickener 9 where a solids rich sludge stream 17 is separated from a liquid-rich crude product stream 26. A stream 39 containing settling agent may be fed to the thickener 9 to expedite the separation of solids from the liquid. The solids rich sludge stream 17 is fed to reactor 5 and the liquid-rich crude product stream 26 is fed through pump 13 to the last reactor 7. The third reactor 6 is operated preferably at about 130° C. and approximately 22 psig.

The reaction mix in the final reactor 7 is stirred and temperature is controlled by indirect heat exchange by pumping a heating or chilling fluid, typically steam or water, respectively, through external coils on the reactors. The temperature in the reactor 76 is controlled by feeding heating or chilling fluid through line 32 to the external cooling coils and then back to the heating or chilling system through return line 36. The crude product 19 from reactor 7 is fed to a thickener 8 where a solids rich sludge stream 16 is separated from a liquid-rich crude product stream 25. A stream 38 containing settling agent may be fed to the thickener 8 to expedite the separation of solids from the liquid. The solids rich sludge stream 16 is fed to reactor 6 and the liquid-rich crude product stream 25 is cooled in a heat exchanger 12 by indirect heat exchange with the process water 3. The chilled crude product stream 37 is then sent for product dilution and storage. The final reactor 7 is operated preferably at about 140° C. and approximately 28 psig.

An alternative embodiment contemplated by the invention is illustrated in FIG. 2. As shown in FIG. 2, a stream fed at a suitable rate of finely divided hematite ore (ferric oxide) is fed to reactor 52 to form a fixed bed 53 of ferric oxide in reactor 52. Concentrated (93 wt %) sulfuric acid 51, and process water 56, preheated in heat exchanger 57, are continuously fed to the fixed bed 53 of reactor 52. The solids are retained as a fixed bed 53 in the reactor by filter medium 54. The reactor is operated preferably at about 140° C. and approximately 28 psig. The reactants are retained in bed 53 and sulfuric acid and water are passed through the bed in a substantially plug flow. The temperature in the reactor 52 is controlled by feeding heating or chilling fluid through line 59 to one or more external cooling coils (not shown) and then back to a heating or chilling supply system (not shown) through return line 60. In FIG. 2, the cooling fluid is depicted as being fed co-current so that the lowest temperatures would be expected near the ferric oxide entry region of the reactor. The crude product stream 55 from the reactor is cooled in heat exchanger 57 by indirect heat exchange with the process water 56. The chilled product stream 58 is then sent for product dilution and storage.

The principle aspects of the invention and the best modes in which it is contemplated to apply those aspects have been described. It is to be understood that details provided in the foregoing are illustrative only and that other means and techniques can be employed without departing from the true scope of the invention as described in the following claims.

What is claimed is:

1. A process for manufacturing liquid ferric sulfate comprising:
   (a) combining and agitating in one or more closed reaction vessels streams of a reaction mixture of
      (i) finely-divided ferric oxide,
      (ii) water, and
      (iii) concentrated sulfuric acid;
   (b) heating said mixture to a reaction temperature while agitating the reactants and while controlling the temperature and pressure;
   (c) agitating and maintaining said mixture at a reaction temperature and pressure until the reaction is substantially complete;
   (d) separating the resultant crude reaction product stream into an aqueous ferric sulfate rich stream and a solids-rich stream;
   (e) feeding the ferric sulfate rich stream countercurrently to a stream of finely divided ferric oxide and recycled solids stream in a subsequent downstream reaction; and
   (f) collecting said aqueous ferric sulfate solution as a product of the process from the reaction of a series of reactions.

2. The process of claim 1 wherein the ferric oxide rich stream is re-circulated to a previous application reaction.

3. The process of claim 1 wherein a portion of the solids-rich stream is recycled for additional reaction to in a downstream application reactor.

4. The process of claim 2 wherein the reaction vessels are used in series to increase the single-pass conversion of reactants to product and to reduce the size of the reactors.

5. The process of claim 1 wherein the ferric oxide reactant solids are charged to at least one fixed bed wherein said solids are retained in the bed using a filter medium and the acid and water streams are passed through the bed in a substantially plug flow.

6. The process of claim 1 wherein an before effective amount of a polymeric settling agent is introduced into the reaction mixture to aid in the separation of iron ore fines from the reactor output.

7. The process of claim 1, wherein the sulfuric acid stream fed to the reaction vessel has a concentration of about 93%.

8. The process of claim 1, wherein said mixture comprises about 28 weight percent ferric oxide, about 30 weight percent concentrated sulfuric acid, and about 42 weight percent water.

9. The process of claim 1 wherein the average particle size of said ferric oxide fed to the reaction vessel in step (a) is about 20 microns.

10. The process of claim 1 wherein the removal of unreacted iron fines from the reaction vessel output is aided by a polymeric settling agent.

11. The process of claim 10 wherein the polymeric settling agent is a cationic polyacrylamide.

12. The process of claim 4 wherein the reactor vessels are equipped with internal baffles.

13. The process of claim 4 in which a filter medium is used to retain the solids within the reactors.

14. The process of claim 13 in which the filter medium is cloth, diatomaceous earth, or a porous ceramic.

15. The process of claim 1 wherein the finely divided ferric oxide has a particle size below about 100 microns.

16. The process of claim 1 wherein a reactor vessel is equipped with internal baffles.

17. The process of claim 1 wherein the reactants ferric oxide solids are charged to at least one re-circulating fluidized bed wherein said solids are retained in the bed using a cyclone and the acid and water streams are passed through the bed in a substantially plug flow.

18. The process of claim 1 wherein the final reaction mixture is processed to contain a sub-stoichiometric ratio of acid to iron oxide.

\* \* \* \* \*